Jan. 10, 1950 C. E. WIEGAND ET AL 2,493,935
HIGH-ENERGY NEUTRON COUNTER
Filed March 15, 1948
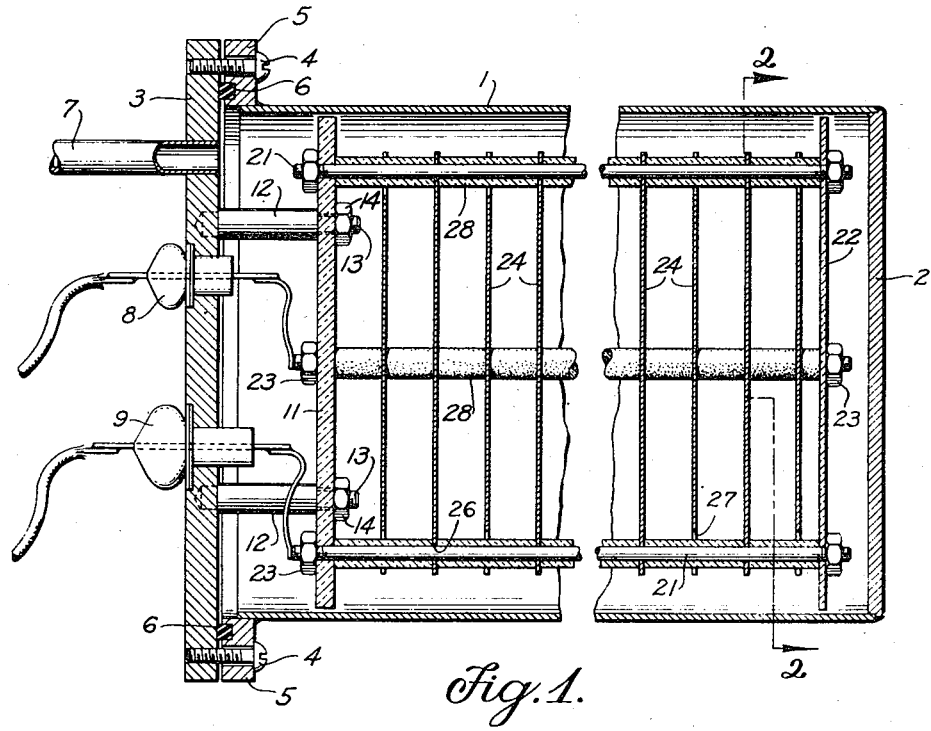
Fig. 1.
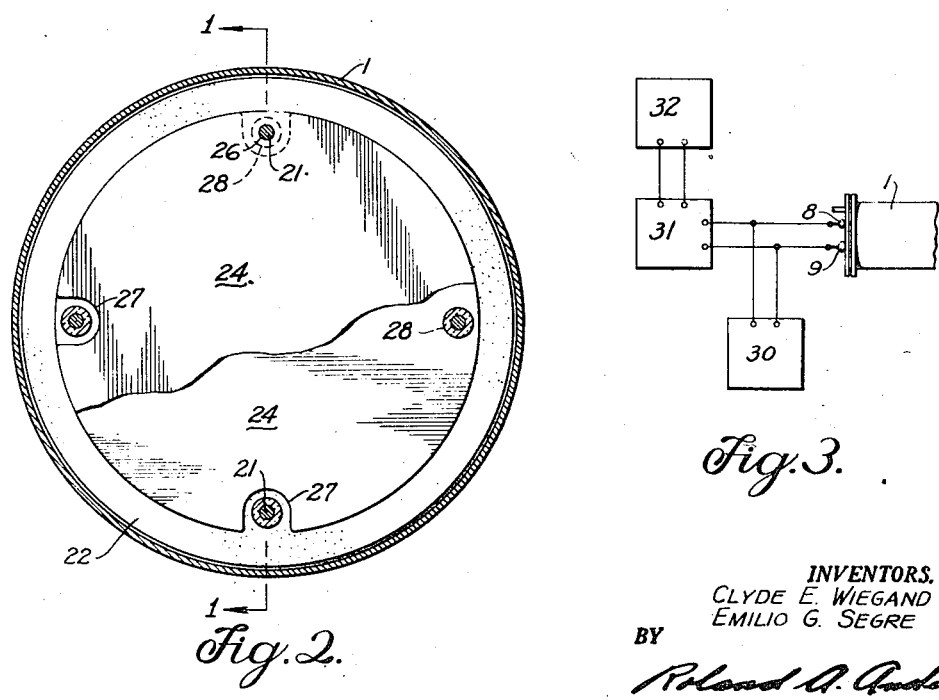
Fig. 2.
Fig. 3.
INVENTORS.
CLYDE E. WIEGAND
EMILIO G. SEGRE
BY
ATTORNEY Patented Jan. 10, 1950

2,493,935

UNITED STATES PATENT OFFICE 2,493,935

HIGH-ENERGY NEUTRON COUNTER

Clyde E. Wiegand, Oakland, and Emilio G. Segre, Berkeley, Calif., assignors to the United States of America as represented by the United States Atomic Energy Commission Application March 15, 1948, Serial No. 14,854

6 Claims. (Cl. 250—83.6)

The present invention relates to a method and apparatus for the determination of the presence of high energy neutrons. The invention further indicates the relative abundance of high energy neutrons present and the apparatus may be constructed so as to indicate only neutrons having an energy greater than a chosen critical value.

Due to the fact that neutrons are electrically neutral, that is to say, have no electrical charge, the conventional particle counters will not indicate their presence. The proportional counter, Geiger counter, and other charged particle counters have become commonplace instruments in all industries having particle radiation problems. In fact, such instruments are a necessity in order to safeguard personnel; however, the detection and protection from neutron radiation is of equal importance. Heretofore the detection of high energy neutrons has been a rather tedious job accomplished with rather cumbersome apparatus. Actually no simple instrument has been available to directly detect high energy neutrons as their high speed and absence of charge allows them to pass unnoticed through most substances. One method now in use to detect high energy neutrons is to place some material containing hydrogen in the path of the neutrons and then detect the protons resulting from collisions between the neutrons and hydrogen nuclei.

The instant invention embodies a new principle in the field of high energy neutron counters, namely, that of fission. The term "fission" as herein employed denotes a particular type of nuclear reaction as defined in Senate Report No. 1211, Calendar No. 1251, section V, Glossary of Scientific Terms Relating to Atomic Energy, page 82, Fission. This definition as herein applicable states: "In fission, the nucleus is stimulated by the capture of a neutron which strikes it. Immediately, or sometimes with a slight delay, the nucleus becomes unstable, breaks into two main fragments which are nuclei of elements of medium atomic weight, and spills out several neutrons." The term "fission" as used in this disclosure carries no meaning of chain reaction or self-reproduced fission but merely an original separation of the nucleus into two main fragments as a result of neutron bombardment.

Recent experiments indicate that those elements having an atomic weight between iridium and polonium are fissionable by high energy neutron bombardment. Specific and extensive data has been collected concerning the fission products of certain of these elements including platinum, gold, mercury, thalium, lead and bismuth. This data provides new materials to be used in the indication of high energy neutrons. Furthermore, these elements only undergo fission when bombarded with neutrons having an energy in excess of some minimum energy and with the knowledge of these minima it is possible to devise neutron counters which count only neutrons having an energy in excess of a desired amount.

The term "high energy" is only relative and is used to distinguish particles having a large energy in comparison to particles having a lesser energy. The amount of energy that may be imparted to atomic particles is steadily increasing as new and more powerful equipment is developed. Thus the concept of high energy particles changes almost from day to day. However, in order to define the present invention the term "high energy" is used herein to denote energies of forty million electron volts and greater. At the present time an upper limit is imposed by the ability of the available apparatus to impart energy to atomic particles. The elements mentioned above undergo fission when bombarded by neutrons having an energy between forty million electron volts and the maximum energy that it is possible to impart to neutrons, with the lighter of the elements requiring neutrons of greater energies. With the development of apparatus capable of producing particles of still greater energies it follows that elements of even lower atomic numbers than the ones presented herein will be fissionable and that these elements may be utilized according to the principles of the present invention.

It is an object of this invention to provide a method and apparatus for indicating the presence of high energy neutrons.

Another object is to provide means for indicating the presence of high energy neutrons by the fission of a target metal.

Another object is to provide means for indicating the presence of neutrons having an energy greater than specified critical minima by the fission of particular target metals.

Another object is to provide means for indicating the relative abundance of high energy neutrons present in any particular space.

Another object is to provide an instrument suitable for indicating the presence and abundance of neutrons having energies in excess of forty million electron volts.

A further object of this invention is to provide a method of detecting and counting high energy neutrons by the utilization of the physical phenomenon of fission.

Other objects, together with some of the advantages to be derived in utilizing the present invention, will become apparent from the following detailed description, taken together with the accompanying drawings wherein:

Figure 1 is a sectional view of the neutron counter chamber taken along plane 1—1 of Fig. 2;

Fig. 2 is a sectional view of the neutron counter taken along plane 2—2 of Fig. 1;

Fig. 3 is a schematic electrical wiring diagram showing connections between the neutron counter and associated electrical apparatus.

With reference to Figs. 1 and 2 it may be noted that the neutron counter chamber, or envelope, outwardly comprises a brass cylinder 1 having a circular brass plate 2 rigidly joined to one end thereof, thus securely closing one end of cylinder 1, and a thicker circular brass base plate 3 secured by means of bolts 4 to a brass flange 5 joined about the other end of the cylinder 1 thus also closing the other end of the cylinder 1. An annular gasket 6 fits into an identation in the flange 5 and contacts the plate 3 thus providing a vacuum-tight seal at this end of the chamber. Piercing the circular base plate 3 are three elements, one being a hollow pipe 7, and the other two being metal-to-glass seals 8 and 9, each passing through base plate 3 with a vacuum-tight seal.

An interior view of the chamber, as shown in Fig. 1, illustrates a circular first insulating disc 11 of an electrically non-conducting material which is of slightly smaller diameter than the inside diameter to the base plate 3, being maintained at a distance from the base plate 3 by four spacers 12 inserted therebetween. The spacers 12 are positioned equal distances apart about a circle of approximately one half the radius of the top insulating disc 11. The spacers 12 are hollow and bolts 13 are placed therein, threadably engaging the base plate 3 at one end and piercing the bottom insulating disc at the other, with nuts 14 threadably engaging the bolts on the opposite side of the first insulating disc 11 from the base plate and thereby firmly securing the first insulating disc 11 to the base plate 3 at a distance from the base plate as determined by the length of the spacers 12.

Four brass support rods 21 extend perpendicularly from the insulating disc 11 the length of the cylinder 1 to second insulating disc 22 which is formed of an electrically non-conducting material and is parallel to and separated from the end wall 2 of the chamber. The second insulating disc 22 is of the same diameter as the first insulating disc 11 and has four holes formed therein, as has the first insulating disc 11, the holes in each disc being equidistantly spaced about a circle having a diameter of approximately three-quarters of the disc diameter. The support rods pass through corresponding holes in each disc and nuts 23 threadably engage each end of the support rods 21 on the outer side of the discs 11 and 22.

A number of identical aluminum discs 24 having a lesser diameter than the insulating discs are separated by spacers 28 and are positioned between and parallel to the first and second insulating discs 11 and 22. The aluminum discs are coated with a very thin layer of bismuth, the layer being of the order of one milligram per square centimeter. Each aluminum disc has two holes 26 formed therein of a diameter equal to that of the support rods 21 as shown in Fig. 2. These holes lie on the same diameter as the holes in the insulating discs 11 and 22 and are diametrically opposite each other. Each disc 24 also has two semicircular portions 27 cut away. These portions are diametrically opposite each other and each is ninety degrees removed from the holes 26. The centers of the semicircular portions 27 lie on the same radius as do the centers of the holes 26 and the radius of the semicircle is great enough that the deleted portion 27 extends into the disc a greater distance than do the holes 26.

The aluminum discs 24 are arranged so that the holes 26 in alternate discs are aligned. The support rods 21 pass through the holes 26 in alternate discs and through the deleted portions 27 of the intervening discs and thus each support rod 21 contacts only alternate discs with each disc being contacted by two support rods. The aluminum discs 24 are separated approximately one inch and are maintained in this position by insulating spacers 28. The length of each spacer 28 is twice the distance between discs plus the width of one aluminum disc as each spacer passes through one disc and abuts a disc at either end.

Thus the internal arrangements of the chamber consist of a first insulating disc 11 rigidly positioned at a distance from the base plate 3, four support rods 21 supporting a number of parallel bismuth coated aluminum discs 24 spaced apart along the length of the cylinder 1, alternate discs contacting the same support rods which pass through a second insulating disc 22 and by means of nuts 23 threadably engaging the ends thereof support and secure the aluminum discs within said chamber.

The chamber is evacuated and then filled with argon to a pressure slightly above atmospheric, thereby insuring an uncontaminated operating atmosphere as any leaks occurring would be in an outward direction and not affect the interior of the chamber. The internal atmosphere comprises 3 per cent carbon dioxide in addition to the argon, the carbon dioxide being added to increase electron mobility in the gas.

As stated above, alternate aluminum discs contact the same support rod and thus are electrically connected. Connections are made from the two support rods which contact the same aluminum discs to one of the glass-to-metal seals 8 and from the two support rods contacting the other discs to the other glass-to-metal seal 9. Thus two electrical leads emerge from the chamber, one from one set of discs and the other from the alternate set.

Considering the associated electrical apparatus it is to be noted that a power supply 30 is provided to impress a potential between the discs 24 which are the ionization electrodes. With the particular embodiment depicted herein the value of this potential may be chosen somewhere between 40 volts and 800 volts or even higher. This embodiment is ordinarily operated at a potential of 400 to 500 volts; however, the potential is not critical and satisfactory operation may be obtained with widely varying potential values. There is further provided a conventional pulse amplifier 31 and scaler circuit 32 which is connected between the leads from the chamber providing thereby an indication of the presence and amount of ionization within the chamber.

In regard to the operation of the detector, assume the chamber to be placed in a beam of high energy neutrons with the discs substantially perpendicular to the beam. Under this condition high energy neutrons are impinging upon the thin layer of bismuth which coats the aluminum discs. Bismuth undergoes fission when bombarded with neutrons of energies in excess of forty million electron volts. Thus, assuming the neutron beam to be of sufficient energy, fission of the bismuth occurs in the chamber. The fission products of bismuth have an atomic number of approximately one half that of bismuth, or about 40. These lighter particles are very heavily charged and provide an ionization energy of approximately eighty million electron volts. The amount of fission is a direct function of the amount of high energy neutrons present, and the amount of ionization of the gas within the chamber varies directly with the amount of fission products formed. The external electrical circuits indicate the ionization within the chamber and thus also indicate the presence and concentration of high energy neutrons.

Thus the presence of high energy neutrons is directly indicated as a result of the fission of a metal which subsequently produces ionization of a surrounding gas which is itself easily detectable.

As stated above, only neutrons having an energy in excess of forty million electron volts cause bismuth to fission and thus the detector discriminates with respect to neutrons of lower energy. As a result of this phenomenon, it is possible to detect neutrons having an energy greater than any desired minimum value by proper selection of the material used to coat the aluminum discs. For example, thalium may be used to detect neutrons having a greater minimum energy and gold for a still higher minimum. Experiments reveal that the efficiency or probability of fission by neutrons having a specified energy lessens as the atomic weight of the target metal decreases.

Various other hitherto undiscussed factors are of importance in connection with the instant invention. As previously noted, the discs in this particular embodiment are made of aluminum and coated with the target metal. This reduces cost and other problems relating to structural strength and forming processes with no loss of accuracy or efficiency. Aluminum has an extremely low capture cross section for high energy neutrons and thus, insofar as the neutron beam is concerned, has no effect upon the operation of the counter. Various materials are suitable to be used as backing for the target material, the limitation being that the disc must be transparent to high energy neutrons, which means they either have a low capture cross section for high energy neutrons or are sufficiently thin to produce the same result. It is to be noted that the number of discs 24 has not been specified. In the particular embodiment depicted, thirty-two such discs are used, however this is not a critical number. Generally, the more discs that are used, the higher the efficiency; but a limitation is imposed owing to the fact that the electrical capacity of the system increases with the addition of more discs to the detriment of the operation of the pulse amplifier and counter. Also as the efficiency varies with the metal used, it is possible to have fewer discs for a heavier target element. It is necessary to have at least two electrodes in order to produce ionization, however in particular cases it is possible to reduce the number of plates to one and to make the enclosing chamber or envelope the other electrode.

It is to be further noted that it is not necessary to coat every disc with the target metal, and the target metal may be applied to either or both sides of the discs that are coated. The present embodiment would operate satisfactorily with only alternate discs coated and assuming other geometries of electrode conformation and placement it would be necessary only to coat enough electrodes that neutron bombardment would provide fission fragments in the proper areas to ionize the atmosphere between desired electrodes. However, the number of discs used and the number coated with target metal is of only secondary importance as they do not influence the principles of the invention.

From the foregoing it is apparent that the present invention provides a counting device for high energy neutrons embodying a new principle in the field of counters, namely, fission. This invention provides a new and invaluable scientific instrument in the field of radioactive research and industry as well as a practical protective device for the personnel engaged in these fields.

What is claimed is:

1. In a high energy neutron counter, the combination comprising a plurality of parallel spaced electrodes separated by an ionizable atmosphere, said electrodes being transparent to high energy neutrons, at least one of said electrodes being coated with a thin layer of bismuth having a thickness of the order of one milligram per square centimeter, and means impressing a potential between adjacent electrodes.

2. A high energy neutron counter including an envelope enclosing an ionizable atmosphere, a plurality of parallel spaced electrodes mounted in said envelope, said electrodes and at least a portion of said envelope being transparent to high energy neutrons, at least one of said electrodes having a thin coating of bismuth thereon of the order of one milligram per square centimeter, means impressing a potential between adjacent electrodes, means introducing high energy neutrons into said envelope, and means including a counter circuit indicating ionization occurring between adjacent electrodes within said envelope.

3. In a high energy neutron counter the combination comprising an envelope, an ionizable atmosphere contained therein, a plurality of parallel electrodes spaced apart within said envelope, alternate electrodes comprising a material fissionable only by high energy neutron bombardment, and means impressing a predetermined potential between adjacent electrodes.

4. A high energy neutron counter as claimed in claim 3 further characterized by said envelope and said electrodes being pervious to high energy neutrons.

5. In a high energy neutron counter the combination comprising an envelope containing an ionizable atmosphere, a plurality of parallel electrodes spaced apart within said envelope, said electrodes comprising two sets of substantially equal number, the first of said sets comprising the alternate electrodes, and the electrodes of this set comprising a first structural material and a second material in the form of a thin coating upon said first material and having the physical property of undergoing fission only when bombarded with high energy neutrons, and means impressing a predetermined potential between said sets of electrodes.

6. In a high energy neutron counter the combination comprising an envelope containing an ionizable atmosphere, a plurality of electrodes spaced apart within said envelope and separated by said atmosphere, alternate electrodes being electrically connected, thereby defining two sets of electrodes, at least one of said sets of electrodes comprising a material that is fissionable by neutron bombardment only when said bombarding neutrons have an energy in excess of a known minimum above forty million electron volts, and means impressing a predetermined potential between said electrodes whereby only fission fragments of said material cause ionization of said atmosphere.

CLYDE E. WIEGAND.
EMILIO G. SEGRE.

REFERENCES CITED

The following references are of record in the file of this patent:

UNITED STATES PATENTS

| Number | Name | Date |
|---|---|---|
| 2,408,230 | Shoupp | Sept. 24, 1946 |
| 2,409,498 | Keston | Oct. 15, 1946 |
| 2,457,781 | Metten et al. | Dec. 28, 1948 |

OTHER REFERENCES

Evans, Review of Scientific Instruments, vol. 7, December 1936, pp. 441–444.